(12) United States Patent
Kamath et al.

(10) Patent No.: US 10,536,540 B2
(45) Date of Patent: Jan. 14, 2020

(54) COMPUTING SYSTEM ARCHITECTURE FOR PRODUCING FILE ANALYTICS

(71) Applicant: Microsoft Technology Licensing, LLC, Redmond, WA (US)

(72) Inventors: Kristen Kamath, Bellevue, WA (US); Jonathan Fred Keslin, Kirkland, WA (US); Angela Allison, Bellevue, WA (US); Reema Bhagat, Seattle, WA (US); Jonathan Rosenberg, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 289 days.

(21) Appl. No.: 15/199,736

(22) Filed: Jun. 30, 2016

(65) Prior Publication Data

US 2017/0318103 A1  Nov. 2, 2017

Related U.S. Application Data

(60) Provisional application No. 62/330,829, filed on May 2, 2016.

(51) Int. Cl.
*H04L 29/08* (2006.01)
*H04L 12/26* (2006.01)
*G06F 16/182* (2019.01)

(52) U.S. Cl.
CPC .......... *H04L 67/22* (2013.01); *G06F 16/1827* (2019.01); *H04L 43/08* (2013.01); *H04L 67/06* (2013.01); *H04L 67/10* (2013.01)

(58) Field of Classification Search
CPC ......... H04L 67/22; H04L 43/08; H04L 67/06; H04L 67/10; G06F 17/302; G06F 16/1827
USPC ........................................................ 709/224
See application file for complete search history.

(56) References Cited

U.S. PATENT DOCUMENTS

| | | | |
|---|---|---|---|
| 8,612,470 B1 * | 12/2013 | Fushman | .......... G06F 17/30867 707/749 |
| 8,856,230 B2 | 10/2014 | Alev et al. | |
| 9,171,104 B2 | 10/2015 | Gotz et al. | |
| 9,208,153 B1 * | 12/2015 | Zaveri | ............... G06F 17/30867 |
| 9,251,013 B1 | 2/2016 | Walsh et al. | |
| 9,275,161 B2 | 3/2016 | Kass et al. | |
| 9,767,302 B2 * | 9/2017 | Lim | ....... G06F 21/604 |
| 9,807,135 B1 * | 10/2017 | Hansen | ................ G06F 16/178 |
| 2002/0016788 A1 | 2/2002 | Burridge | |
| 2003/0097564 A1 * | 5/2003 | Tewari | .................... H04L 12/14 713/171 |

(Continued)

OTHER PUBLICATIONS

"International Search Report and Written Opinion Issued in PCT Application No. PCT/US2017/029538", dated Aug. 10, 2017, 12 Pages.

(Continued)

*Primary Examiner* — Philip J Chea
*Assistant Examiner* — Wing Ma
(74) *Attorney, Agent, or Firm* — Medley, Behrens & Lewis, LLC

(57) ABSTRACT

Described herein is a system architecture that supports generating analytics data about files hosted by a file hosting server. Also described herein are various graphical user interfaces that are well-suited to present at least a portion of the analytics data to a user.

20 Claims, 11 Drawing Sheets

(56) References Cited

U.S. PATENT DOCUMENTS

| | | | |
|---|---|---|---|
| 2004/0255048 A1* | 12/2004 | Lev Ran | G06F 9/546 709/249 |
| 2005/0114711 A1* | 5/2005 | Hesselink | H04L 63/0209 726/4 |
| 2005/0232423 A1* | 10/2005 | Horvitz | G06Q 10/10 380/255 |
| 2007/0060099 A1* | 3/2007 | Ramer | G06Q 30/02 455/405 |
| 2007/0156726 A1* | 7/2007 | Levy | G06F 21/10 |
| 2012/0317135 A1* | 12/2012 | Jin | G06F 16/176 707/769 |
| 2013/0073983 A1* | 3/2013 | Rasmussen | G06Q 30/02 715/753 |
| 2013/0139091 A1* | 5/2013 | Raciborski | H04L 67/06 715/772 |
| 2013/0166503 A1* | 6/2013 | Chung | G06F 16/178 707/610 |
| 2013/0185292 A1* | 7/2013 | Li | G06F 17/30522 707/723 |
| 2013/0198304 A1* | 8/2013 | Jung | H04L 12/1818 709/206 |
| 2013/0238777 A1* | 9/2013 | Raleigh | H04L 67/1097 709/223 |
| 2013/0318589 A1* | 11/2013 | Ford | H04L 63/08 726/7 |
| 2014/0006347 A1* | 1/2014 | Qureshi | H04L 63/20 707/621 |
| 2014/0033068 A1 | 1/2014 | Gupta et al. | |
| 2014/0188796 A1* | 7/2014 | Fushman | G06F 17/30867 707/624 |
| 2014/0215564 A1* | 7/2014 | Banatwala | H04L 63/0815 726/3 |
| 2015/0088851 A1 | 3/2015 | Deshpande et al. | |
| 2015/0095322 A1* | 4/2015 | Procopio | G06F 17/3053 707/723 |
| 2015/0149583 A1* | 5/2015 | Chung | G06F 16/435 709/217 |
| 2015/0188971 A1* | 7/2015 | Yoon | H04L 67/20 709/219 |
| 2015/0248480 A1* | 9/2015 | Miller | G06F 17/30864 707/723 |
| 2015/0304338 A1 | 10/2015 | Pherson et al. | |
| 2015/0312288 A1* | 10/2015 | Icho | G06F 13/00 709/204 |
| 2015/0350299 A1* | 12/2015 | Pineas | G06F 16/16 709/203 |
| 2016/0019298 A1 | 1/2016 | Brodie et al. | |
| 2016/0072841 A1* | 3/2016 | Caporal | G06F 3/0482 726/1 |
| 2016/0226903 A1* | 8/2016 | Arcamone | H04L 63/1425 |
| 2016/0277374 A1* | 9/2016 | Reid | H04L 63/061 |
| 2016/0359957 A1* | 12/2016 | Laliberte | H04L 51/32 |
| 2017/0024100 A1* | 1/2017 | Pieper | G06F 3/0486 |
| 2018/0027006 A1* | 1/2018 | Zimmermann | H04L 63/0245 726/11 |
| 2018/0332064 A1* | 11/2018 | Harris | G06F 15/16 |

OTHER PUBLICATIONS

Sarvghad, et al., "Exploiting Analysis History to Support Collaborative Data Analysis", in Proceedings of Graphics Interface Conference, Jun. 3, 2015, pp. 123-130.

Llorente, et al., "Use of Metadata in a Collaborative Editing Service", In Proceedings of 7th ICCC/IFIP International Conference on Electronic Publishing, Jun. 25, 2003, pp. 229-236.

Tor, Daniel, "Collaborative visual analytics in multi-disciplinary health care teams", Published on: Aug. 16, 2015, Available at: <<http://dare.uva.nl/cgi/arno/show.cgi?fid=613083>>, 28 pages.

Heer, et al., "Graphical Histories for Visualization: Supporting Analysis, Communication, and Evaluation", In Journal of IEEE Transactions on Visualization and Computer Graphics, Oct. 19, 2008, 8 pages.

Dufilie, et al., "Weave: A Web-based Architecture Supporting Asynchronous and Real-time Collaboration", In Proceedings of International Working Conference on Advanced Visual Interfaces, May 21, 2012, 3 pages.

"Crosspoint: Managed File Transfer & Collaboration for Healthcare", Retrieved on: Apr. 25, 2016, Available at: <<http://www.ajilitee.com/services/managed-analytics/crosspoint-managed-file-transfer-collaboration-for-healthcare/>>, 3 pages.

"Collaborative Analytics", Retrieved on: Apr. 25, 2016, Available at: <<https://alation.com/solutions/collaborative-analytics/>>, 3 pages.

* cited by examiner

COMPUTING SYSTEM ARCHITECTURE FOR PRODUCING FILE ANALYTICS

RELATED APPLICATION

This application claims the benefit of U.S. Provisional Patent Application No. 62/330,829, filed on May 2, 2016, and entitled "COMPUTING SYSTEM ARCHITECTURE FOR PRODUCING FILE ANALYTICS", the entirety of which is incorporated herein by reference.

BACKGROUND

File hosting applications allow for files to be retained at file hosting servers that are in network communication with client computing devices, rather than the files being stored on the client computing devices themselves. Because files hosted at file hosting servers are not tied to a specific client computing device, the files can be readily shared with others and be subject to collaboration by way of the file hosting application. Enterprises are using file hosting applications more frequently, such that the tasks of maintaining storage for hosted files and backing up hosted files is offloaded to the file hosting application. Conventionally, however, the file hosting applications do not provide information about files hosted by such services that may enhance productivity of an enterprise that utilizes a file hosting application.

SUMMARY

The following is a brief summary of subject matter that is described in greater detail herein. This summary is not intended to be limiting as to the scope of the claims.

Described herein are various technologies pertaining to displaying information pertaining to analytics data about an entity or entities hosted at a file hosting server that are accessible to multiple client computing devices (e.g., in an enterprise) by way of a hosting application executing on the hosting server. The hosting application provides an environment where entities accessible by way of the file hosting application can be collaborated on by multiple users who are authorized to access such entities. The file hosting application, for entities hosted at the hosting server, is configured to track activities of various types undertaken with respect to such entities. Exemplary activity types undertaken on entities that can be tracked by the hosting application include, but are not limited to, "view", "edit", "comment", "share", "schedule meeting" (where the entity is referenced in a meeting object), "email" (where the entity is referenced in an email), "move", "copy", etc. The hosting application can further track identities of users who performed activities on entities, roles of users in an enterprise, times when the activities were performed on entities, geographic locations where activities were performed on entities, etc.

Using this tracked data, analytics data about an entity (e.g., file, file folder, user identifier, enterprise, etc.) can be determined, and graphical information can be presented based upon the analytics data. The analytics data can be indicative of activities (or lack of activities) undertaken with respect to an entity or entities over some window of time. Graphical information presented based upon the analytics data can provide an end user with insight about the entity or entities that can enhance productivity of the end user or a group to which the end user belongs (a team, an enterprise, etc.). For instance, the graphical data can indicate a number of activities of a certain type performed with respect to an entity over a time window, and can further indicate how the number of activities compare with activities performed with respect to the entity over other (e.g., adjacent) time windows. Further, since roles of users in an enterprise can be known, the analytics data can be indicative of a reach of an entity (e.g., how far outside of the team of the user the entity has reached due to file sharing or discovery by way of the hosting application).

Further, based upon analytics data determined about an entity or entities, graphical data that is designed to improve productivity can be presented on a display. For example, an identify of a file that has been most edited by members of a team can be identified and surfaced to a team leader, so that the team leader can further analyze the file. In another example, recommended activities can be surfaced about an entity based upon analytics data about an entity or entities. For instance, when it is determined that an entity has not been viewed for some window of time, a recommendation can be surfaced to a team leader to schedule a meeting about the entity.

DETAILED DESCRIPTION

Figure 1:
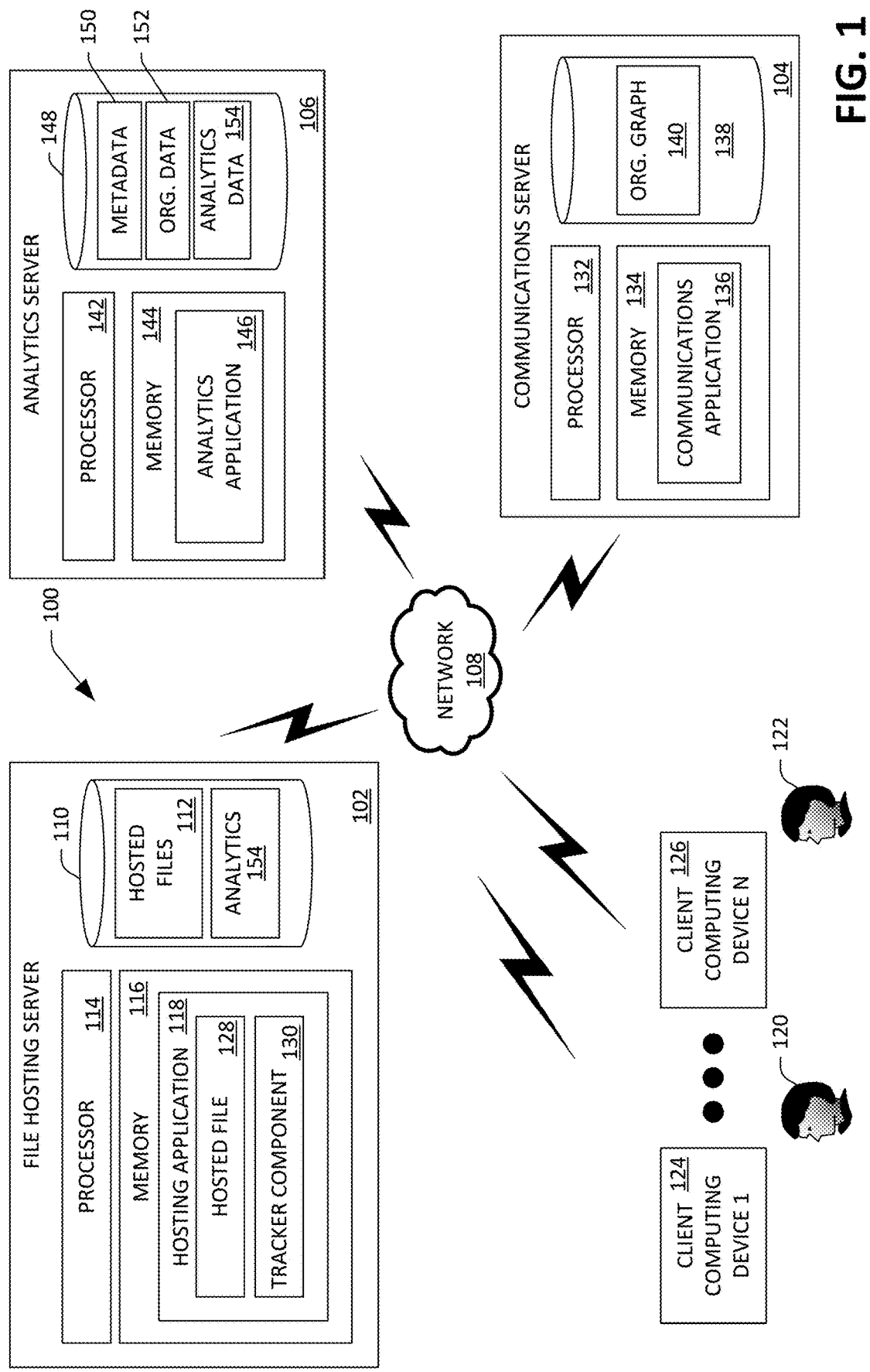
FIG. 1 is a functional block diagram of an exemplary system that facilitates causing analytics data about entities hosted at a file hosting server to be displayed on a display of a client computing device.

Various technologies pertaining to causing analytics data about entities (e.g., files, file folders, user identities, etc.) hosted at a file hosting server executing a file hosting application are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates providing analytics data about entities hosted at a file hosting server is illustrated. The system 100 includes a file hosting server 102, a communications server 104, and an analytics server 106, wherein the servers 102-106 are in communication with one another by way of a network 108. While the file hosting server 102, the communications server 104, and the analytics server 106 are illustrated as being separate server devices, it is to be understood that functionality described as being performed by the servers 102-106 separately may be performed by a single server device or across several other server devices.

The file hosting server 102 includes a data store 110 that stores hosted entities (files) 112 for an organization (enterprise). For instance, the file hosting server 102 can be tasked with hosting files for the enterprise. The file hosting server 102 additionally includes at least one processor 114 and memory 116 that stores instructions that are executed by the processor 114. The memory 116 has a hosting application 118 loaded therein that, when executed by the processor 114, provides services related to hosting entities (e.g., the files 112) at the file hosting server 102. These services can include, but are not limited to, backing up files in the hosted files 112, providing a file system for the hosted files 112, assigning and enforcing permissions for files in the hosted files 112 (e.g., such that a user can define who in the organization has certain capabilities with respect to a file or files). Furthermore, the hosting application 118 may, in some instances, provide access to applications that can be used to create and edit files. For instance, the hosting application 118 may be configured to provide access to a word processing application to end-users (e.g., by way of a web browser), wherein such word processing application can be used by the end user to create a file that is to be hosted at the file hosting server 102 and edit the the when hosted at the file hosting server 102.

As indicated previously, the file hosting server 102 may host files for an enterprise that includes a plurality of users 120-122, wherein the users 120-122 can access the file hosting server 102 through use of respective client computing devices 124-126 (which may be or include desktop computing devices, laptop computing devices, tablet computing devices, mobile computing devices (e.g., mobile phones, wearable computing devices, etc.), head-mounted computing devices, etc.). When, for example, the first computing device 124 is employed by the user 120 to create or access a hosted file 128, the hosting application 118 loads the hosted file 128 into the memory 116. The user 120, through operation of the client computing device 124, may then view, edit, rename, share, or perform some other activity with respect to the hosted file 128.

The hosting application 118 can include a tracker component 130 that can track activities undertaken with respect to the hosted file 128 over time, and the tracker component 130 can generate metadata that describes such activities. For example, the tracker component 130, responsive to identifying that an activity is being undertaken with respect to the hosted file 128, can generate metadata that includes: 1) an identifier of the hosted file 128; 2) an identifier of a type of the activity (e.g., "created", "edited", "shared", "renamed", "viewed", "deleted", "commented", etc.); 3) a time when the activity was started with respect to the hosted file 128; 4) a time when the activity was completed with respect to the hosted file 128; 4) an identity of the user 120 who performed the activity; 5) an identity of a user who "owns" the file, amongst other data. The tracker component 130 can generate this metadata for each activity undertaken with respect to each file in the hosted files 112 by users in the enterprise (or approved vendors or partners). The file hosting server 102 can, from time to time, transmit this metadata to the analytics server 106 by way of the network 108.

The communications server 104 includes a processor 132 and memory 134 that stores instructions that are executed by the processor 132. The memory 134 can have a communications application 136 loaded therein, where the communications application is configured to facilitate exchange of electronic messages between the client computing devices 124-126. For instance, the communications application 136 can be an email application, an instant messaging application, a unified communications (UC) application, a social networking application, or other suitable communications application. The communications server 104 further includes a data store 138 that can include an organizational graph 140 for the enterprise that includes the users 120-122. The organizational graph 140 can include information pertaining to the hierarchy of the enterprise that includes the users 120-122. For instance, the organizational graph 140 can indicate, for each user in the enterprise, identities of subordinates of the user, identities of supervisor(s) of the user, geographic location of the user, identities of teams to which the user belongs, and so forth. Further, the organizational graph 140 can identify that some users are vendors, some are partners, and so forth.

The analytics server 106 is generally configured to index the metadata received from the file hosting server 102 and search over the indexed metadata to produce analytics data about files in the hosted files 112. It is to be understood, however, that acts of indexing and searching may be performed on separate devices. Analytics data produced by the analytics server 106 is distinguishable from data provided by conventional file hosting applications, which typically only indicate who has most recently viewed a hosted file. With more particularity pertaining to the analytics server 106, the analytics server 106 includes at least one processor 142 and memory 144 that stores instructions that are executed by the processor 142. The memory 144 has loaded therein an analytics application 146 that receives the metadata from the file hosting server 102 and produces analytics data about users, files, activities, etc.

The analytics server 106 includes a data store 148 that can retain metadata 150 provided by the file hosting server 102. As noted above, the metadata 150 can include metadata for a file, where such metadata can include an identity of the user that is generally responsible for the file (an identity of the user who "owns" the file), an identity of a user who performed an activity on the file, an identity of a type of the activity performed on the file, a time when the activity was started, a time when the activity was completed, and so forth. The data store 148 can also include organizational data 152, which is received from the communications server 104. The organizational data 152 can be data extracted from the organizational graph 140 or may be the organizational graph 140 itself. In a non-limiting example, when the analytics application 146 receives metadata pertaining to a file, the analytics application 146 can cause a query to be transmitted to the communications server 104 to retrieve organizational data from the organizational graph 140 about users identified in the metadata. This retrieved data can be saved as the organizational data 152 in the data store 148. Using the metadata 150 and the organizational data 152, the analytics application 146 can generate analytics data 154 pertaining to at least one hosted file in the hosted files 112, and further pertaining to at least one user in the users 120-122 identified in the organization graph 140.

Several non-limiting examples of analytics data that can be produced by the analytics application 146 are now set forth. In a first example, analytics data about a particular hosted file in the hosted files 112 can be generated. This analytics data can indicate, for instance, for a specified time window, a number of activities that were performed with respect to the hosted file, a trend for activities with respect to the specified window of time (e.g., whether more or fewer activities were undertaken with respect to the file when compared to other, potentially adjacent, windows of time), a number of users who performed the activities during the window of time, identities of the users who performed the activities during the window of time, a number of different teams who have performed activities on the hosted file during the window of time, geographic locations of users who have performed the activities on the hosted file during the window of time, an average amount of time spent by users when viewing the hosted file, an indication of when a most recent activity was performed with respect to the hosted file, how many times certain types of activities were performed with respect to the hosted file (e.g., how often the file was viewed versus how often the file was edited), etc.

In another example, the analytics application 146 can generate analytics data about a certain user in the users 120-122. For example, the analytics application 146 can receive an identity of the user 120 and can obtain information about the user's role in the organization from the organizational graph 140. The analytics application 146 can also receive metadata from the file hosting server 102, where at least some of the metadata identifies the user 120. The analytics application 146 may then output analytics data, such as, but not limited to, an identity of a hosted file upon which the user 120 has spent the most time, identities of hosted files upon which the user 120 has most recently conducted activities, an identity of a file owned by the user 120 that has the furthest reach (e.g., an identity of a most-viewed file owned by the user 120; an identity of the file owned by the user that has been viewed by the largest number of teams, etc.), an identity of a file owned by the user 120 that has been edited (collaborated upon) more than any other file owned by the user, an identity of a file owned by the user that has been the subject of the most tasks (e.g., assigned by way of the communications server 104 and/or the hosting application 118), an identity of a file owned by the user that has been shared the most by way of the hosting application 118, and so forth.

In a third example, the analytics application 146 can output analytics data about a file folder rather than a file itself (i.e., the most accessed file folder, a file in the file folder that is accessed most frequently, a number of users in the enterprise who have accessed the file folder, and so on).

In a fourth example, the analytics application 146 can provide analytics data about a team (rather than an individual user). This analytics data can include, but is not limited to including, a collective amount of time members of the team have conducted activities on a hosted file, an identity of the hosted file that has been most collaborated upon (e.g., the file that has been edited by the most users when compared to other files), an identity of a hosted file that has most recently been edited by members of the team, types of files upon which activities have been conducted most often by members of the team, trends pertaining to an activity or certain types of activities on hosted files accessed by members of the team, etc.

In a fifth example, the analytics application 146 can provide data that is useable to produce recommendations for an end user, where the recommendations are for activities with respect to entities that are accessible to the end user. For example, the analytics application 146 can produce data that indicates that a certain file is referenced in a meeting that is to occur in one hour, and further indicates that no one has viewed the file in the last two weeks. The analytics application 146 (or the hosting application 118), based upon this analytics data, can output a recommendation to the meeting organizer, where the recommendation is to reschedule the meeting. This recommendation can be shown on a web page, pushed in a notification to the end user, etc.

As the analytics application 146 has access to the organizational graph 140 of the enterprise, the analytics application 146 can provide robust analytics data about files, activities, and users in the enterprise. After the analytics application 146 has produced the analytics data 154, the analytics server 106 can transmit the analytics data to the file hosting server 102, wherein the analytics data 154 can be retained in the data store 110. The hosting application 118 may then return analytics data to one or more of the client computing devices 124-126 responsive to receipt of a request for such analytics data. For instance, when the user 120 causes the client computing device 124 to load the hosted file 128 in the hosting application 118, the hosting application 118 can execute a query over the analytics data 154 and retrieve analytics data about the hosted file 128. In another example, when a communication is to be transmitted by way of the communications server 104, identities of individuals to receive a communication can be provided to the user 120. The user 120 may request analytics data about the person, and such analytics data can be retrieved from the analytics server 106. In another example, the analytics server 106 can be configured to execute queries over the indexed metadata (referenced above). In such an example, the file hosting server 102 can receive a request for analytics data about an entity hosted at the file hosting server 102 from the client computing device 124. In response to receipt of the request, the file hosting server 102 can transmit data to the analytics server 106 that, for instance, identifies the entity (and optionally the user 120 operating the client computing device 124). The data can be directed to the analytics application 146, which can execute a query over the analytics data 154, and cause the analytics server 106 to transmit results of the query to the file hosting server 102, whereupon the hosting application 118 receives the search results. The hosting application 118 can cause at least a portion of the search results to be presented on a display of the client computing device 124 as analytics data about the entity.

Figure 2:
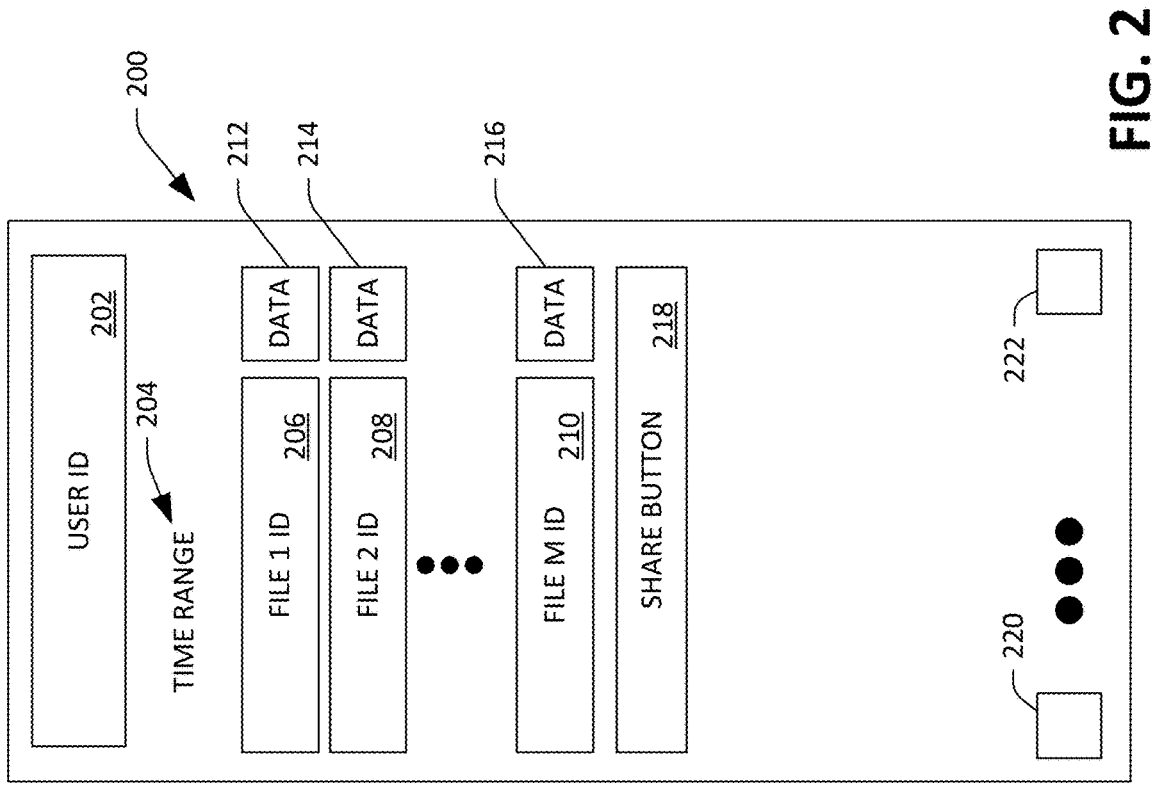
FIG. 2 is an exemplary graphical user interface that facilitates presentation of analytics data about entities hosted at a file hosting server at a client computing device.

Referring now to FIG. 2, an exemplary graphical user interface 200 that can be presented on a display of the client computing device 124, for example, is illustrated. The graphical user interface 200 includes a user identifier 202, which identifies the user 120. For instance, the user identifier 202 can include an image of the user 120, a name of the user 120, and so forth. The graphical user interface 200 may also depict a time range 204, and further includes a plurality of file identifiers 206-210. The time range can be changed based upon user input. The file identifiers 206-210 can identify files upon which the user 120 has performed activities within the depicted time range 204. The file identifiers 208-210 can include icons that are representative of an application that can be used to view a file represented by the file identifier, a name of a file, etc.

The graphical user interface 200 may also include buttons 212-216 that are presented adjacent respective file identifiers 206-210. The buttons 212-216 can have graphical data rendered thereon that is indicative of analytics data about the files represented by the file identifiers 206-210. In a non-limiting example, the graphical data rendered on the button 212 can represent a trend pertaining to activities undertaken with respect to the file identified by the file identifier 206. Therefore, the graphical data may indicate that the file identified by the file identifier 206 has been accessed (e.g., viewed, edited, shared, etc) more often in the time range 204 when compared to how often the file has historically been accessed (e.g., when compared to a historic time range of the same length). When a button in the buttons 212-216 is selected, more detailed analytics data about the file corresponding to the selected button can be presented. For instance, when the button 212 is selected, a graphical user interface can be presented that depicts additional analytics data about the file represented by the file identifier 206.

The graphical user interface 200 may also include a share button 218 that prompts the user to cause more files to be hosted in the file hosting server 102. For example, upon the share button 218 being selected, a window can be provided that allows the user 120 to upload one or more additional files to the file hosting server 102, thereby allowing analytics data to be generated about such files. In another example, when the share button 218 is selected, a graphical user interface that is configured to allow the user 120 to share one or more files owned by the user 120 with other users in the enterprise (where the other users may previously not have been authorized by the file hosting application 118 to access the files). The graphical user interface 200 may further comprise a plurality of buttons 220-222 that, when selected, can change the view in the graphical user interface 200. For instance, selection of the button 222 may remove the analytics data 212-216 from the graphical user interface to 200, such that a conventional view is displayed. In another example, selection of the button 220 may change the view from corresponding to the user to corresponding to a team, organization, etc.

Figure 3:
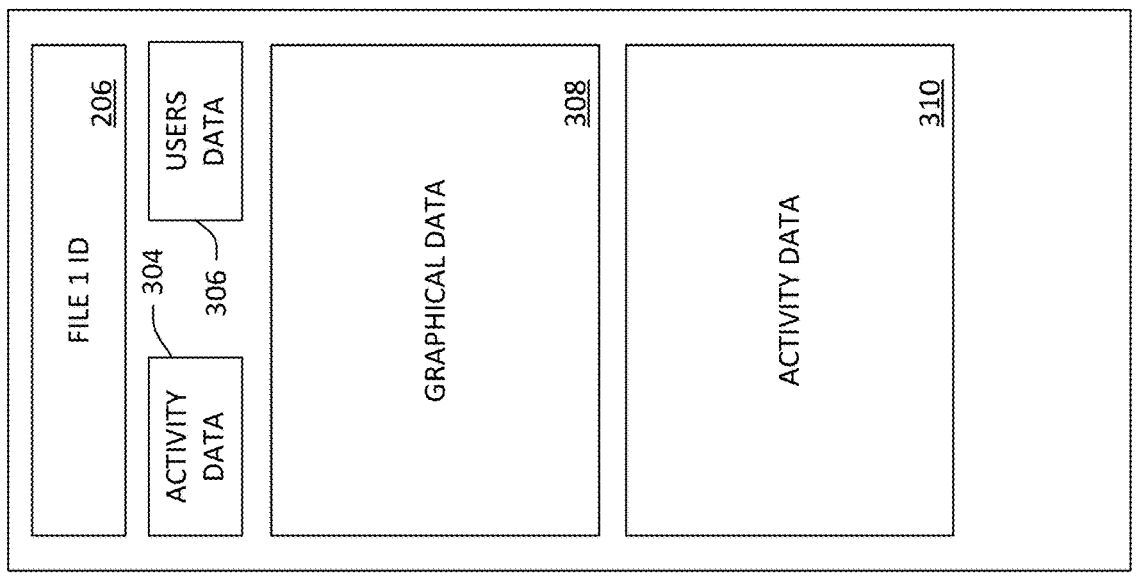
FIG. 3 is an exemplary graphical user interface that is configured to present analytics data about an entity hosted at a file hosting server in graphical form.

Turning now to FIG. 3, an exemplary graphical user interface 300 that depicts analytics data about a particular file is illustrated. For instance, the graphical user interface 300 may be presented responsive to detecting that the user 120 has selected the button 212. The graphical user interface 300 can include the file identifier 206, wherein the graphical user interface 300 includes analytics data about the file represented by the file identifier 206. The graphical user interface 300 further includes activity data 304 that, for instance, can identify a number of activities conducted on the hosted file in the time range 204. In an example, the activity data 304 may be set for a default activity type, such as views, comments, edits, etc. Therefore, for instance, the activity data 304 can depict a number of views of the hosted file in the time range 204, a number of edits made to the hosted file in the time range, etc., depending upon the default activity type. Further, the activity data 304 may be associated with a pulldown menu that allows the user 120 to select a particular type of activity so that user 120 can ascertain a number of activities of the selected type that have been conducted on the hosted file in the time range.

The graphical user interface 300 may further include users data 306. This users data 306 can, for instance, identify a number of users who have conducted the activities identified in the activity data 304 in the time range 204. Again, the users data 306 can be presented as, or associated with, a pulldown, such that the user 120 can select the pulldown and readily ascertain identities of individual users who conducted the activities represented in the activity data 304.

The graphical user interface 300 may also include a field 308 that depicts graphical data, which is representative of analytics data generated by the analytics application 146 for the file identified by the file identifier 302 over the time range 204. For instance, the field 308 can include a graph that depicts activities undertaken with respect to the hosted file over time (e.g., a number of activities conducted with respect to the hosted file for each day of a two-week period specified in the time range 204). Further, the graphical data 308 can identify a number of users who conducted an activity with respect to the hosted file over time. The graphical data shown in the field 308 may be interactive, such that when a user selects a particular point in time, data about that point in time can be presented to the user. More specifically, the graphical user interface 300 may include a second field 310 that presents detailed activity data about the hosted file. When the user has not interacted with the graphical data shown in the field 308, the activity data 310 can be populated with data that identifies most recent activities conducted with respect to the hosted file, as well as identities of users who have conducted those activities on the hosted file. When a particular time in the graph shown in the field 308 is selected, the activity data shown in the field 310 can be updated to identify activities conducted on the hosted file at the selected time, as well as identities of users who performed such activities on the hosted file.

Figure 4:
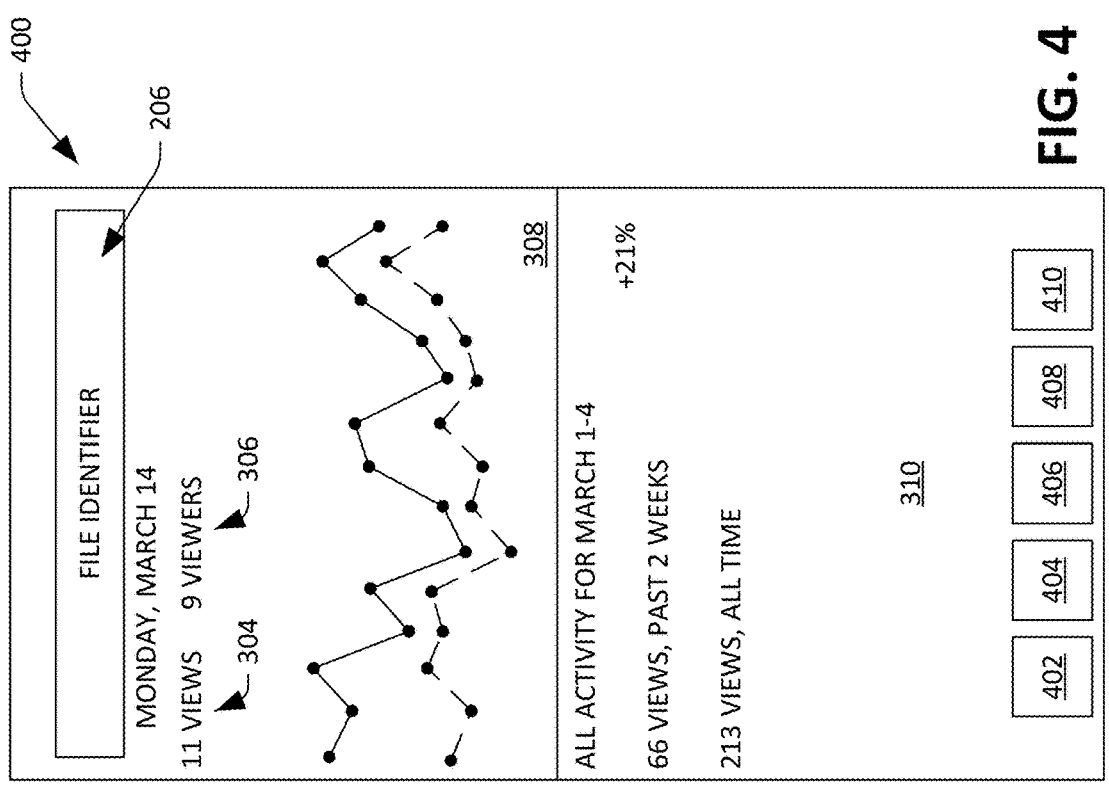
FIG. 4 is an exemplary graphical user interface that includes graphics representing analytics data about an entity.

Referring now to FIG. 4, an exemplary graphical user interface 400 that is well-suited for providing analytics data about a file hosted at the file hosting server 102 is illustrated. The graphical user interface 400 includes the file identifier 206, which comprises the name of the file. The graphical user interface 400 may also include data that identifies a current date, as well as the activity data 304 and the users data 306. In the example graphical user interface 400, the activity data 304 indicates that the hosted file "Gizmo Revolution Proposal" has been viewed 11 times on March 14, and the users data 306 indicates that nine different users viewed the hosted file. The field 308 includes graphical data that represents a number of views of the hosted file over a time window, as well as a number of viewers who viewed the hosted file over the time window. The field 310 includes further activity data about the hosted file, including a trend (e.g., viewership of the hosted file has gone up 21% in the date range of March 4 through March 14 compared to an adjacent date range), a total number of views of the hosted file in such date range, as well as a number of all-time views of the hosted file.

The exemplary graphical user interface 400 further includes a plurality of buttons 402-410 that can change the view provided to the user 120. For example, when the button 402 is selected, a graphical user interface can be presented that depicts a list of files that are accessible to the user 120, when the button 404 is selected, a graphical user interface can be presented that depicts a list of sites that are available to the user 120, when the button 406 is selected, a graphical user interface can be presented that depicts a list of files upon which the user 120 has most recently undertaken activities, when the button 408 is selected, a list of files can be presented, where the list of files includes files that the user 120 has shared, and when the button 410 is selected, a graphical user interface similar to that shown in FIG. 2 can be presented.

Figure 5:
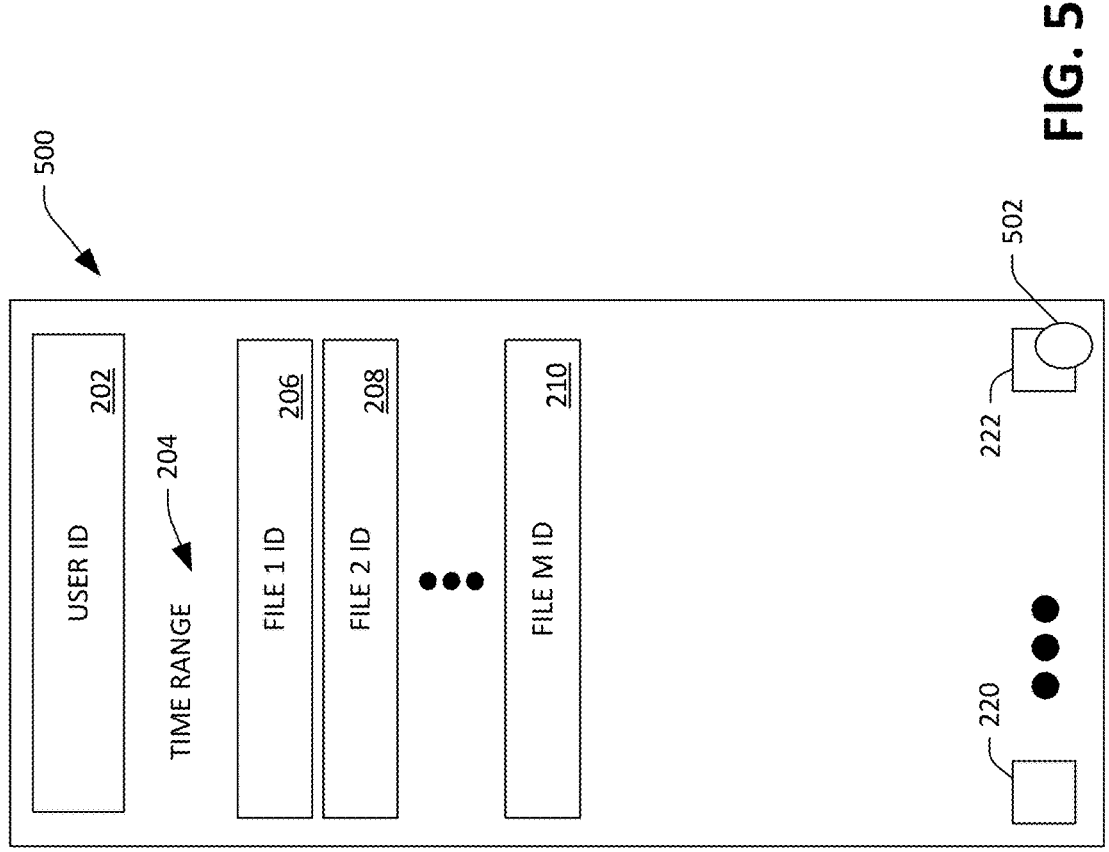
FIG. 5 is an exemplary graphical user interface that includes a button that, when selected, causes analytics data about entities hosted at a file hosting server to be presented.

With reference now to FIG. 5, another exemplary graphical user interface 500 is illustrated. The graphical user interface 500, for instance, can be presented responsive to the user 120 selecting the button 402. The graphical user interface 500 includes the user identifier 202 and the time range 204. Moreover, the graphical user interface 500 includes the file identifiers 206-210. In this exemplary graphical user interface 500, the button 222 includes a badge 502 that indicates to the user 120 that some activity has been undertaken on a hosted file that is owned by the user 120, and that updated analytics data about that the hosted file is available to the user 120 for review. When the button 222 is selected, a graphical user interface, similar to that shown in FIG. 2, can be presented, wherein file identifiers that represent files with most recent analytics data available are presented most prominently (e.g., at the top of the list).

Figure 6:
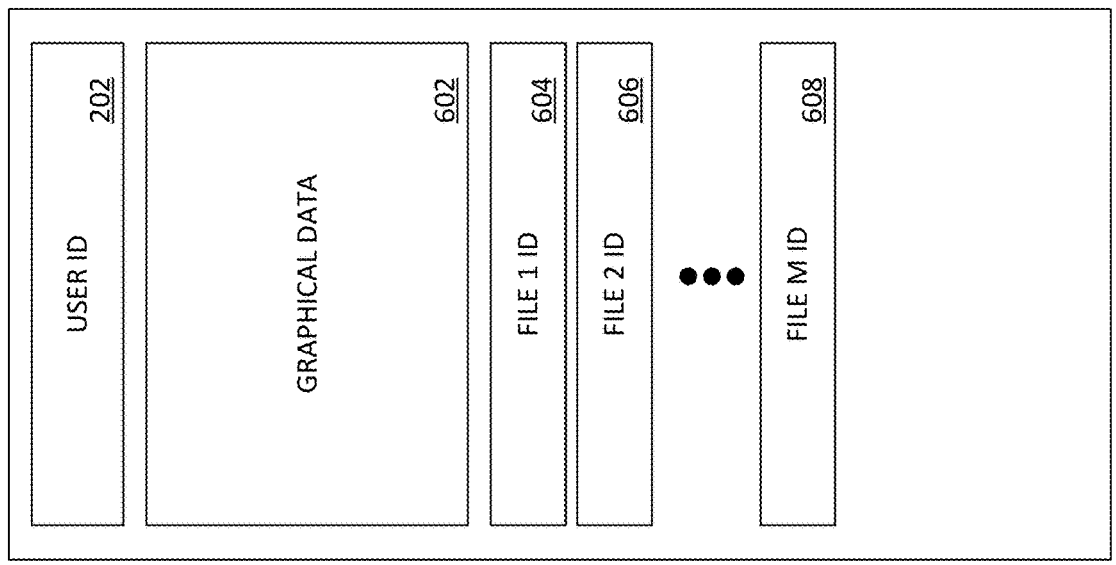
FIG. 6 is an exemplary graphical user interface that is configured to provide analytics data about several entities assigned to a particular user.

With reference now to FIG. 6, an exemplary graphical user interface 600 that is configured to present analytics data about a user who accesses files hosted at the file hosting server 102 is illustrated. The graphical user interface 600 includes the user identifier 202. The graphical user interface 600 further includes a field 602, where analytics data about the user identified by the user identifier 202 can be presented (where the analytics data is provided by the analytics application 146). For instance, the field 602 can include graphical data that represents a number of activities undertaken by the user 120 identified by the user identifier 202 across all files hosted at the file hosting server 102 that the user 120 is authorized by the file hosting application 118 to access. The user 120 has the ability to change the graphical data shown in the field 602 by activity type, time range, file type, or the like.

The graphical user interface 600 also includes a plurality of file identifiers 604-608 that represent files hosted by the file hosting server 102 upon which the user 120 has most recently undertaken activities. In other embodiments, rather than the field 602 including graphical data that represents user activities, the field 602 can include graphical data representative of activities undertaken on files owned by the user 120 (e.g., across the enterprise). For instance, the graphical data in the field 602 can indicate to the user 120 a number of times that files owned by the user 120 have been viewed in the last two weeks. The graphical data 602 can be a graph that depicts such information (e.g., a number of views of files owned by the user for each day over the last two weeks). In such an example, the file identifiers 604-608 can identify the most viewed files owned by the user in the specified time window. While not shown, the file identifiers 604-608 may further have analytics data associated therewith, such as a number of views in the specified time range, a difference in the number of views in the specified time range and an adjacent time range, and so forth. The user 120 can change the time range to obtain activity information about hosted files over various time ranges.

Figure 7:
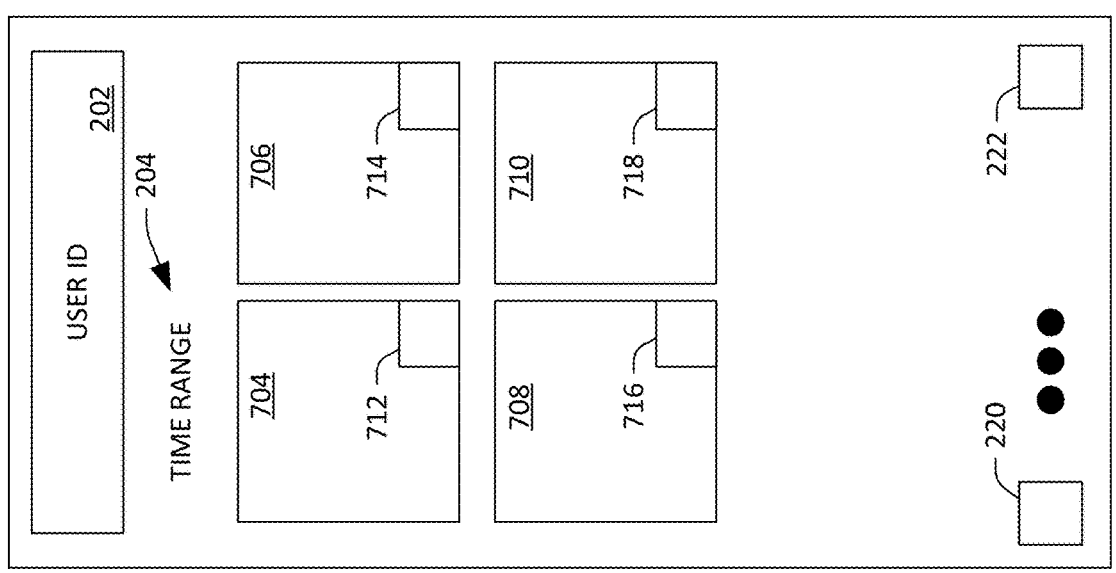
FIG. 7 is an exemplary graphical user interface, where icons representative of files hosted by a file hosting service include graphics that indicate that analytics data about the files is available.

Turning now to FIG. 7, an exemplary graphical user interface 700 that can depict analytics data about files is illustrated. The graphical user interface 700 includes the user identifier 202. In contrast to the graphical user interface 200, the graphical user interface 700 includes file identifiers 704-710 presented in grid form rather than list form. Accordingly, for instance, the identifiers 704-710 may be icons. Rather than buttons depicting the analytics data being shown adjacent a file identifier (such as in the graphical user interface 200), the buttons can be rendered on the identifiers 704-710, and can have badges thereon. Therefore, for example, the badge 712 can indicate a number of activities conducted on a file identified by the file identifier 704 over the time range 204, a trend pertaining to activities conducted on the file identified by the file identifier 704, etc.

Figure 8:
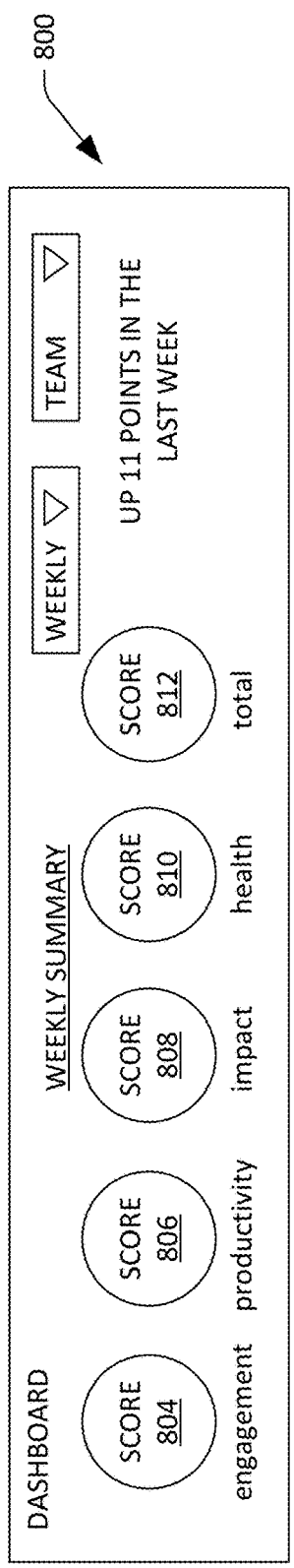
FIG. 8 is an exemplary graphical user interface that provides a high-level overview pertaining to analytics data about entities hosted at a file hosting server.

Now referring to FIG. 8, an exemplary graphical user interface 800 that is well-suited to provide analytics information about a team or organization is illustrated, where the team includes several users, and where analytics data about files created by the team and/or used by the team is desired. The graphical user interface 800 presents summary data about activities pertaining to files hosted by the file hosting server 102 that are accessible to members of the team. For example, the graphical user interface 800 can include graphical data 804-812 that represents various aspects pertaining to the team's interaction with hosted files. For instance, the graphical data 804 can represent how engaged members of the team are with files hosted by the file hosting server 102. The graphical data 806 can represent how productive members of the team are with respect to files hosted by the file hosting server 102 (that are accessible to the members of the team). The graphical data 806 can represent the impact files owned by the team have on the enterprise. The graphical data 810 can represent health of team members with respect to files hosted at the file hosting server 102. The graphical data 812 can represent an average score for the team with respect to engagement, productivity, impact, and health.

Each of the graphical data 804-810 can represent a score pertaining to a team or individual with respect to entities hosted by the hosting application 118. For instance, the graphical data 804 can represent an engagement score, the graphical data 806 can represent a productivity score, the graphical data 808 can represent an impact score, and the graphical data 810 can represent a health score. As indicated previously, the graphical data 812 can represent the average of the aforementioned scores.

Aspects pertaining to determining the scores are now set forth. The engagement score for a team can be a function of a number of entities (e.g., files) belonging to the team that are "active" (e.g., have had some activity conducted thereon over a defined time window), a number of visits to a site where files belonging to the team can be accessed, etc. The engagement score for the team can also be a function of a predefined goal for that team, such as a goal number of active entities for the team over the defined time window. In a specific example, the engagement score for the team can be determined using the following algorithm: ((current number of active entities and site visits)/goal)*100%, where the score cannot exceed 100. The engagement score for an individual can be a function of a number of entities owned by the individual that are "active" over a time window, a number of entities where the individual has performed an activity over the time window, a predefined goal for the individual, amongst other data. In a specific example, the engagement score for the individual can be determined using the following algorithm: (current number of active entities/goal)*100%, where the score cannot exceed 100.

The productivity score for a team or individual can be a function of work time for the team or individual, an amount of time in meetings for the team or individual, an amount of time communicating by the team or individual, and goal times set for such parameters. For instance, for the team, a high productivity score indicates that the team is meeting its goals—e.g., the team is hitting its targets for participating in meetings, communicating via IM and/or email, working on files, and so forth. For the individual, a high score indicates that the individual is meeting his or her goals. In an example, a high score can indicate that the individual is meeting his/her target response time in workflow scenarios, the individual is meeting his/her target for a ratio of time spend in meetings versus time spent on email versus time working on files.

The impact score of the team or individual can be a function of how broadly documents have reached within a team, within an org, and externally—e.g., the impact score is indicative of roles of people viewing files and how people viewed those files. For example, for a team, the impact score for the team can be a function of a number of views of files belonging to the team (e.g., hosted on a team site), where views by users who are not members of the team are weighted more heavily. In a specific example, the impact score for a team can be determined using the following algorithms: (number of views on entities within a team site by members of the team+1.5*the number of views within the site by non-members of the team)=site score, and the impact score=site score/top site score*100% (where the view numbers are within some defined time window). The impact score for an individual can indicate that files owned by the individual have been viewed by a large number of people, with views from people further away in the organization graph being weighted more heavily. For instance, the impact score for the individual can be computed using the following algorithm: (a number of views of files owned by the individuals by users who are on the same team as the individual+1.5*number of views of files by users who are not members of the team of the individual)=site score, and the impact score=site score/top site score*100% (where the view numbers are within some defined time window).

The health score can be indicative of work/life balance of the team and/or the individual. For instance, the health score for a team can be a function of a number of hours during the day where the team is working on files during work hours (for some defined window of time) relative to a number of hours during the day where the team is working on files outside workhours. A high health score for the team indicates that the team is working a high number of hours during the day during work hours and a low number of hours outside of workhours. The health score for the individual can be computed similarly.

Figure 9:
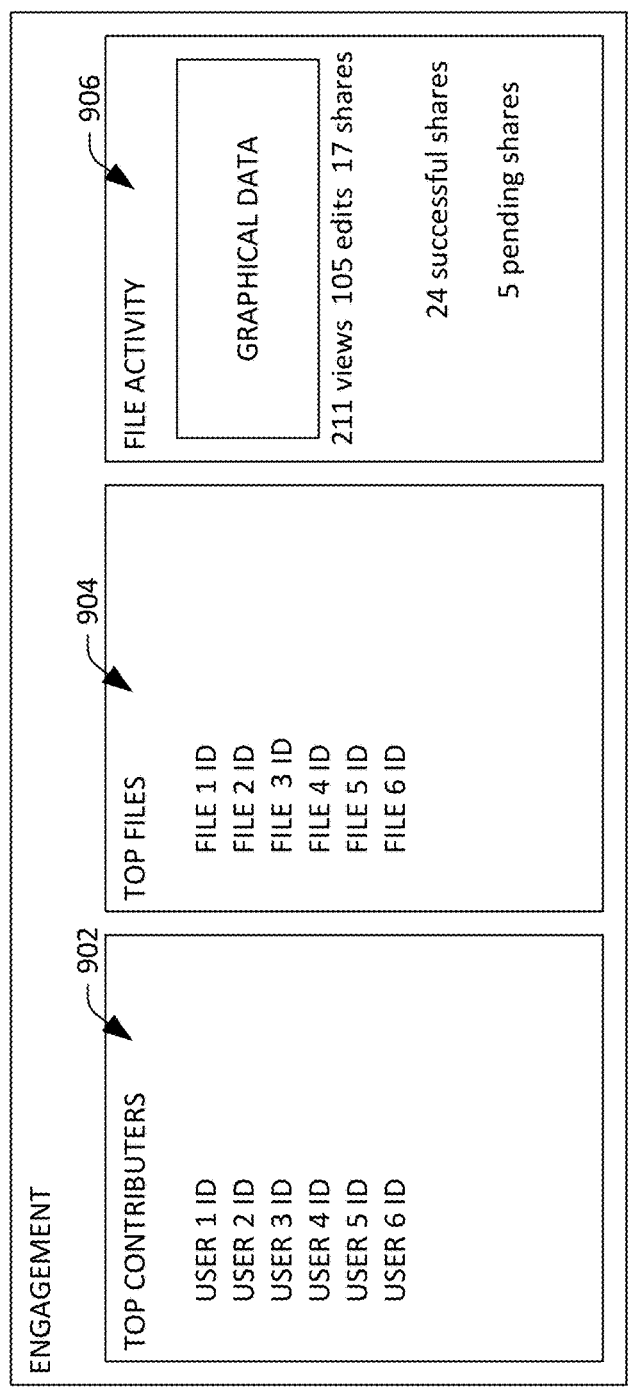
FIG. 9 is an exemplary graphical user interface that presents information pertaining to engagement with files hosted at a file hosting server.

Now referring to FIG. 9, an exemplary graphical user interface 900 that depicts analytics data relating to engagement of the team with respect to files hosted at the file hosting server 102 that are accessible to the members of the team. The graphical user interface 900 includes three sections. A first section 902 identifies top contributors on the team for a specified window of time, where contribution can be measured by a number of files edited by a member of the team, a total amount of time viewing files owned by the team, or the like. A second section 904 identifies top files for the team for the specified window of time, where the files included in the second section 904 can be files edited most often, files viewed most often, files shared most often, etc. A third section 906 can represent activities of team members across all files hosted at the hosting server 102 that are accessed by the team members for the window of time. For instance, the third section can depict a total number of file views over the window of time, a total number of file edits over the window of time, a total number of file shares over the window of time, and so forth.

Figure 10:
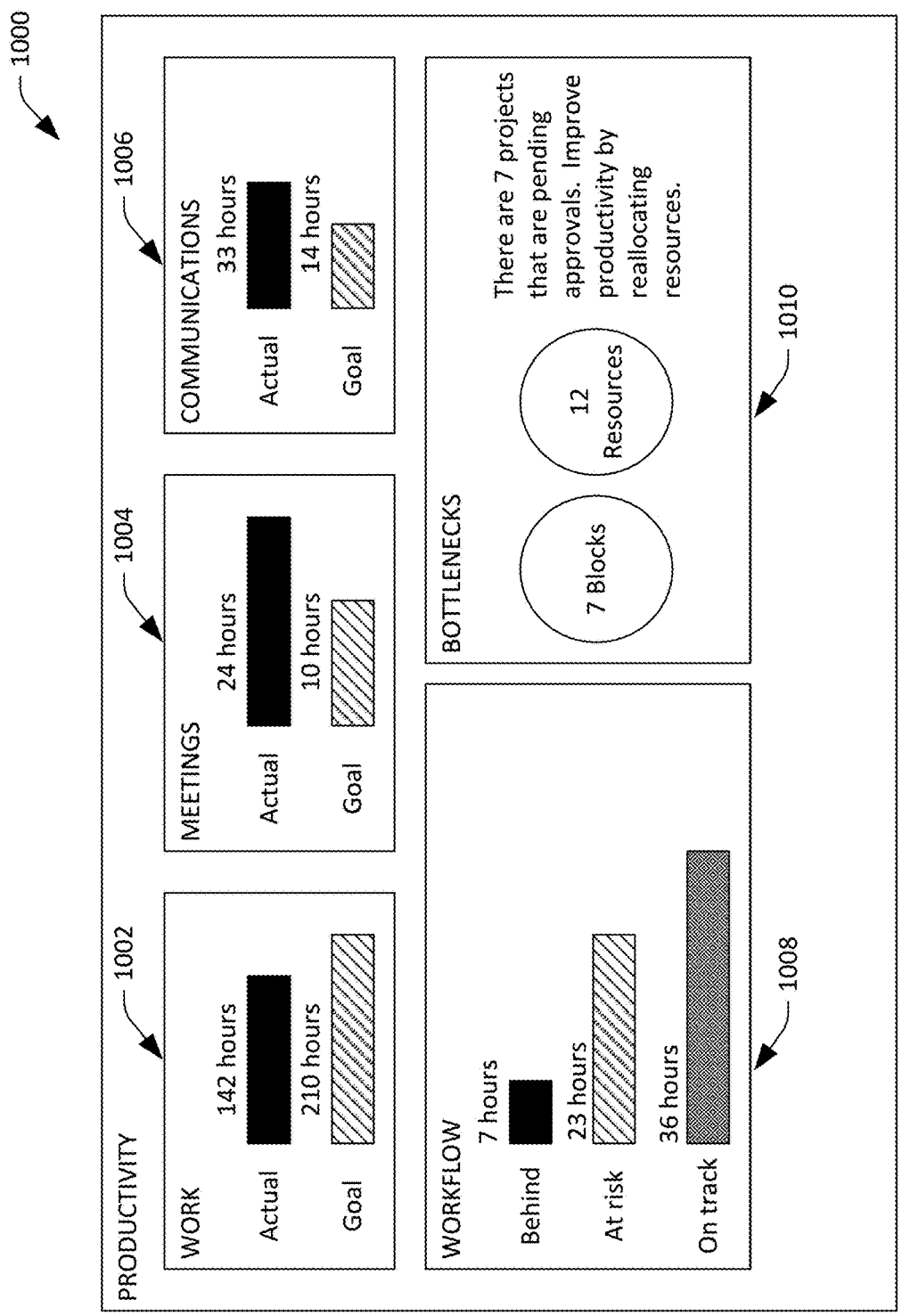
FIG. 10 is an exemplary graphical user interface that presents information pertaining to productivity of users with respect to files hosted at a file hosting server.

Now referring to FIG. 10, an exemplary graphical user interface 1000 that depicts analytics data relating to productivity of team members with respect to files hosted at the file hosting server 102 is illustrated. The graphical user interface 1000 includes five sections. A first section 1002 depicts a total number of hours spent by team members viewing files hosted at the file hosting server 102 relative to a goal for a specified time window. A second section 1004 depicts a total number of hours spent by team members in meetings relative to a goal for a specified time window. A third section 1006 depicts a total number of hours spent by team members communicating about files hosted at the file hosting server 102 relative to a goal for a specified time window. A fourth section 1008 depicts information about workflow with respect to files hosted at a file hosting server, where the information about workflow can indicate whether the team, as a whole, is on track to complete tasks with respect to files on time. A fifth section 1010 depicts graphical information pertaining to bottlenecks in completing tasks.

Figure 11:
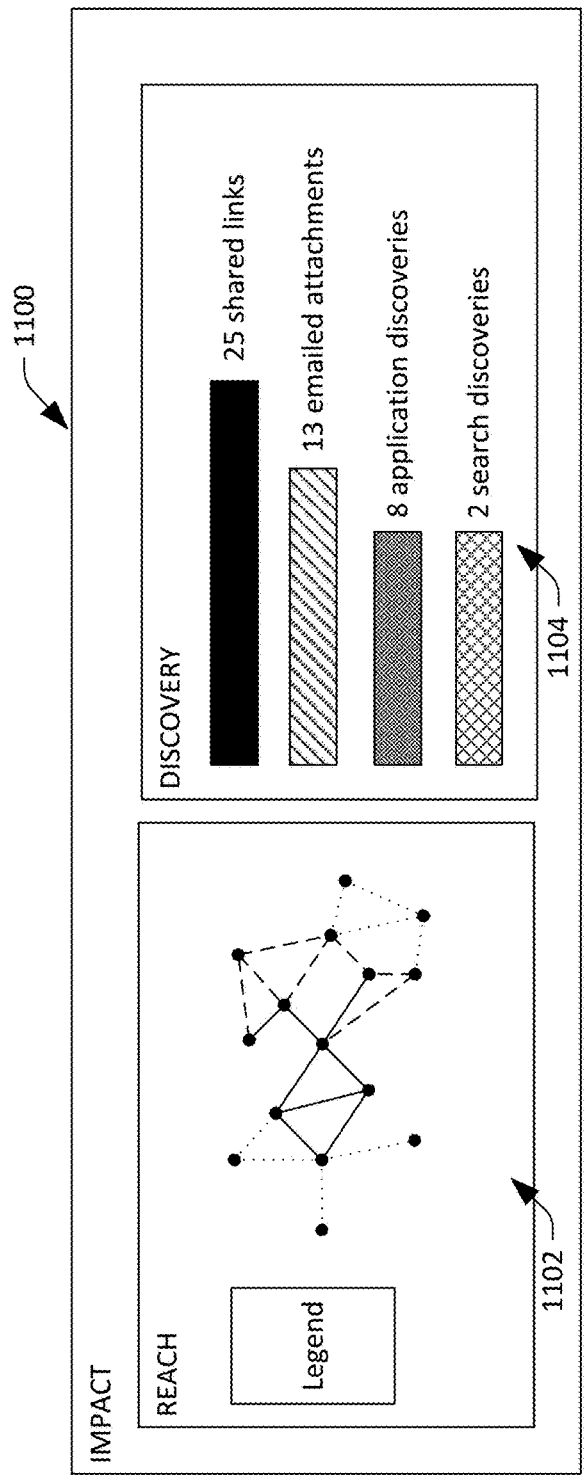
FIG. 11 is an exemplary graphical user interface that presents information pertaining to impact of files with respect to an enterprise, where the files are hosted at a file hosting server.

Now referring to FIG. 11, an exemplary graphical user interface 1100 that is configured to depict analytics data about files hosted at the file hosting server 102 is illustrated. The graphical user interface 1100 comprises two sections. A first section 1102 depicts reach of files owned by the team throughout an enterprise. For instance, the first section 1102 can graphically depict who, across an enterprise (including partners and/or vendors) has reviewed files owned by a member of the team, and how the reviewers of the files accessed such files. For instance, the first section 1102 includes a graph that comprises nodes and edges, where nodes are representative of people and edges are representative of file shares between people. The nodes are color-coded to represent user positions in the enterprise (e.g., purple indicates that the user is a member of the team, blue indicates that the user is a member of the enterprise but not the team, and green indicates that the user is a vendor). The second section 1104 graphically represents how files owned by the team were discovered by others. For example, the second section 1104 indicates that a first number of file discoveries were effectuated through links shared by way of the file hosting application 118, a second number of file discoveries were effectuated through the communications application 136 (e.g., as email attachments), and so forth.

Figure 12:
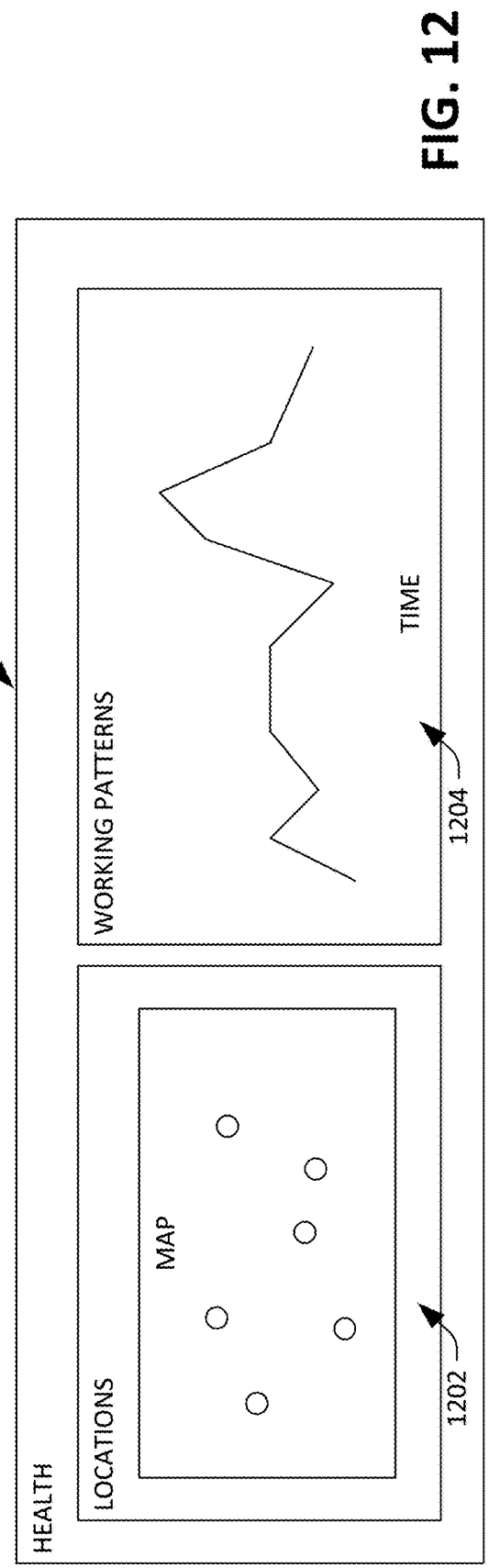
FIG. 12 is an exemplary graphical user interface that depicts analytics data pertaining to files hosted at a file hosting server.

Now referring to FIG. 12, an exemplary graphical user interface 1200 that depicts analytics data about files accessed by members of the team is illustrated. The graphical user interface 1200 comprises two sections. A first section 1202 graphically represents geographic locations of client computing devices operated by members of the team when accessing files hosted at the file hosting server 102. A second section 1204 represents times when members of the team are accessing files hosted at the file hosting server 102.

Figure 13:
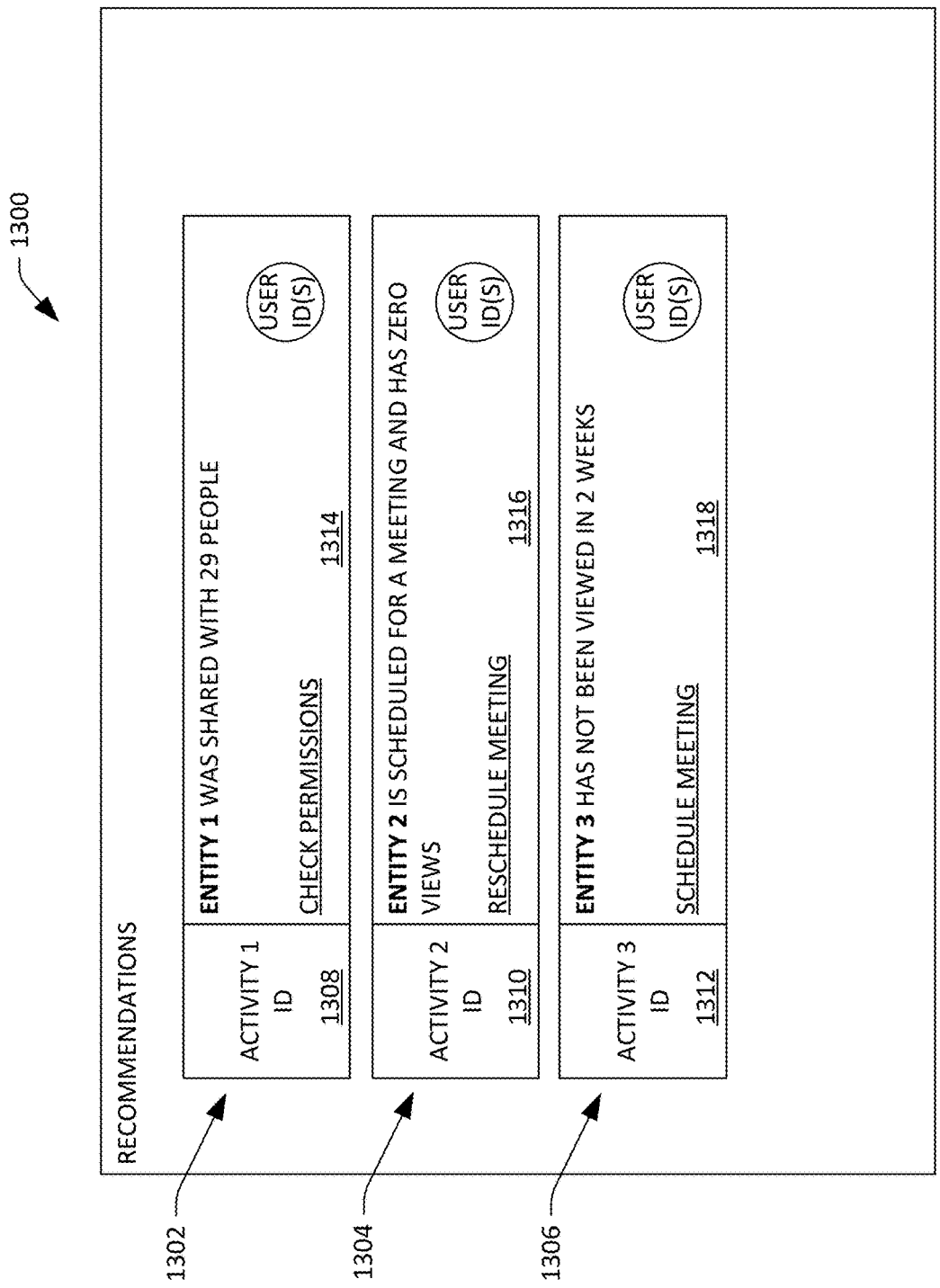
FIG. 13 is an exemplary graphical user interface that depicts recommendations about entities that can be provided based upon analytics data about the entities.

Now referring to FIG. 13, an exemplary graphical user interface 1300 that presents recommendations to a user, where the recommendations can be based upon analytics data computed about an entity or entities. The exemplary graphical user interface 1300 depicts three different recommendations 1302-1306. Each of the recommendations 1302-1306 can include a respective activity identifier 1308-1312, which identifies a recommended activity that can be performed by a viewer of the graphical user interface 1300. The recommendations 1302-1306 can also include activity data 1314-1318, where activity data in a recommendation can include historical data about an entity (e.g., which can indicate why the recommendation is presented), a selectable link that facilitates performance of the recommended activity, and an identify of at least one user who may be impacted if the recommended activity is performed. For instance, for the recommendation 1302, the activity data 1314 includes information that indicates that "entity 1" has been shared with 29 people (e.g., over some defined time window). The activity data 1314 also includes a selectable link that corresponds to the activity "check permissions". For instance, when the link is selected, a page can be presented to the user that identifies permissions corresponding to the entity "entity 1", and can allow the user to update the permissions to restrict edit capabilities to a small number of people). Thus, the recommendation 1302 can be presented based upon the user owning the entity "entity 1" and such entity being shared with a relatively large number of people (e.g., over a relatively small time window). The recommendation 1304 includes data that indicates that a file is scheduled for a meeting, and yet no one has viewed the file; accordingly, the recommendation can be to reschedule the meeting.

Figure 14:
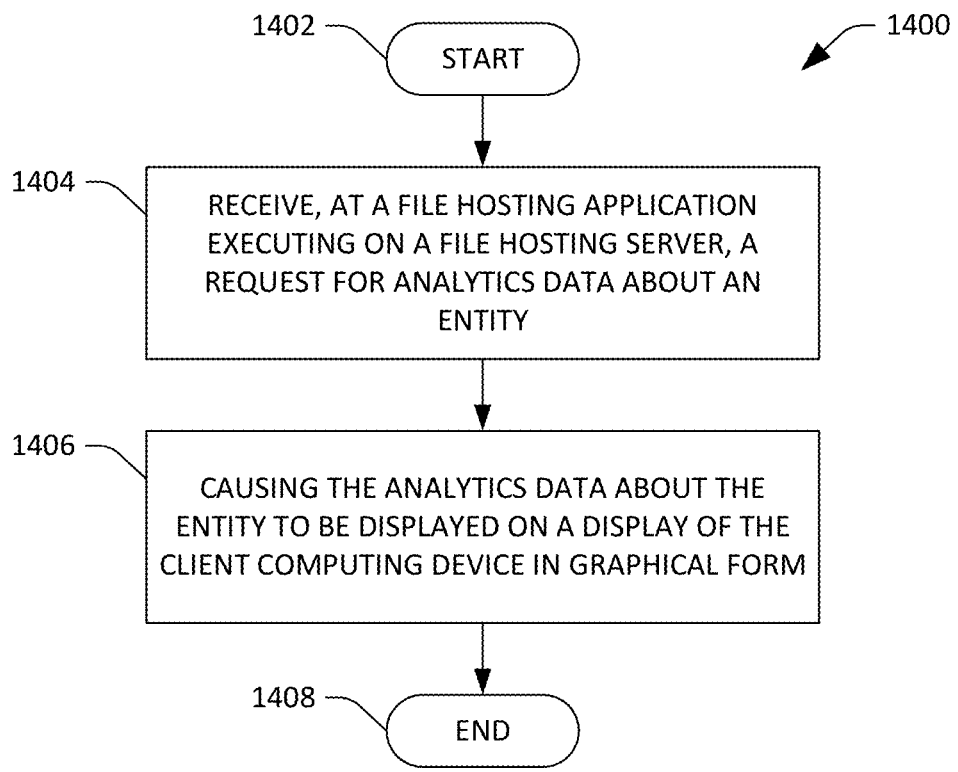
FIG. 14 is a flow diagram that illustrates an exemplary methodology for causing analytics data about an entity to be displayed on a display of client computing device.
Figure 15:
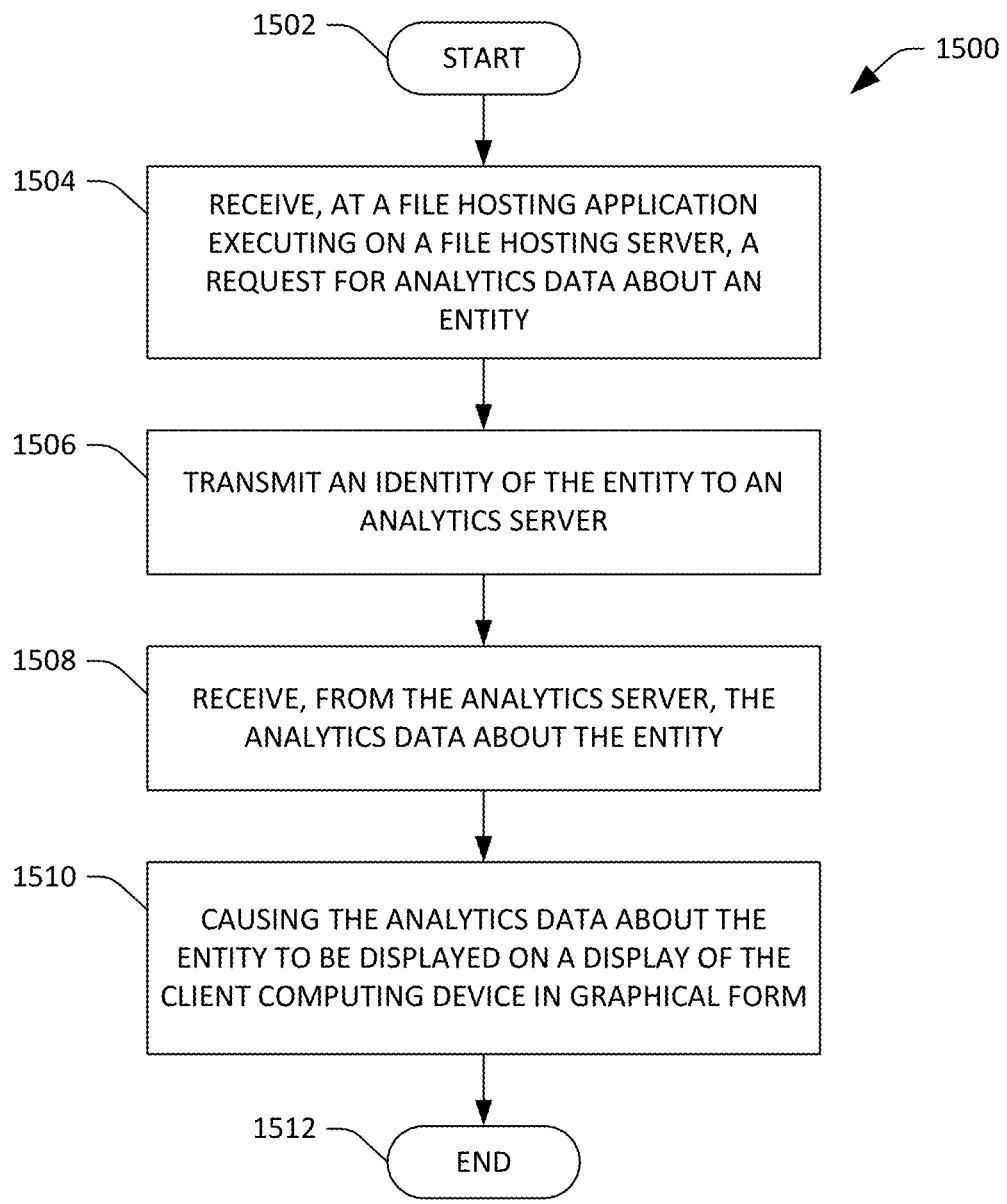
FIG. 15 is a flow diagram that illustrates an exemplary methodology for causing analytics data about an entity to be displayed on a display of client computing device.

FIGS. 14-15 illustrate exemplary methodologies relating to causing analytics data about entities hosted at a file hosting server. While the methodologies are shown and described as being a series of acts that are performed in a sequence, it is to be understood and appreciated that the methodologies are not limited by order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 14, a flow diagram representing an exemplary methodology 1300 for causing analytics data about an entity hosted at a file hosting server to be presented on a display of a client computing device is illustrated. The entity can be a file, a file folder, a user identifier, a team identifier, or the like. The methodology 1400 starts at 1402, and at 1404, at a file hosting application executing on a file hosting server, a request for analytics data about an entity is received, where the entity is hosted at the file hosting server. The request is received from a client computing device that is in network communication with the file hosting server. Further, the entity is accessible to multiple client computing devices operated by users who are authorized by the file hosting application to access the entity. As described previously, the file hosting application provides a collaborative environment, where the users can (sometimes simultaneously) collaborate on entities hosted at the file hosting server.

At 1406, in response to receiving the request for the analytics data about the entity, the analytics data about the entity is caused to be displayed on a display of the client computing device in graphical form. The analytics data is based upon activities (tracked by the file hosting application) undertaken with respect to the entity by way of the file hosting application that is executing on the file hosting server. The activities are undertaken by users who are authorized by the file hosting application to access the entity. The methodology 1400 completes at 1408.

Now referring to FIG. 15, a flow diagram depicting an exemplary methodology 1500 for causing analytics data about an entity hosted at a file hosting server to be presented on a display of a client computing device is illustrated. The methodology 1500 starts at 1502, and at 1504, a request for analytics data is received at a file hosting server (executing a file hosting application) from a client computing device, where the client computing device is operated by a user in an enterprise. The request for analytics data pertains to an entity hosted at the file hosting server. The file hosting application is configured to provide access to the entity to users of the enterprise who are authorized by the file hosting application to access the entity.

At 1506, an identity of the entity is transmitted from the file hosting server to an analytics server, wherein the analytics server is configured to output analytics data about the entity in response to receive of the identity of the entity. The analytics data can be based upon activities undertaken with respect to the entity by users who are authorized by the file hosting application to access the entity (e.g., over some window of time). Exemplary activities include editing the entity, commenting upon the entity, sharing the entity, assigning a task with respect to the entity, completing a task with respect to the entity, transmitting the entity in an email, and so forth. At 1508, the analytics data is received from the analytics server, and at 1510 the file hosting server causes the analytics data to be presented on a display of the client computing device in graphical form. The methodology 1500 completes at 1512.

Various examples are now set forth.

Example 1

A computing system comprising: at least one processor; and memory that has a file hosting application loaded therein, wherein the at least one processor, when executing the file hosting application, is configured to perform acts comprising: receiving, from a client computing device that is in network communication with a file hosting server, a request for analytics data for an entity hosted by the file hosting server, wherein a user of the client computing device has authenticated with the file hosting application; and responsive to receiving the request for the analytics data, causing the analytics data to be presented in graphical form on a display of the client computing device, the analytics data is based upon activities undertaken with respect to the entity over time by multiple users authorized to access the entity using multiple different computing devices.

Example 2

The computing system according to Example 1, wherein the entity is a file hosted by the file hosting server, the acts further comprising: causing a file identifier to be displayed on the display of the client computing device, the file identifier representative of the file hosted by the file hosting server; and causing a button to be displayed adjacent the file identifier, wherein receiving, from the client computing device, the request for analytics data for the file comprises receiving an indication that the button has been selected by the user of the client computing device.

Example 3

The computing system according to any of Examples 1-2, wherein the analytics data indicates a number of users in the multiple users who accessed the entity over a specified window of time.

Example 4

The computing system according to any of Examples 1-3, wherein the analytics data indicates a number of times that the entity was accessed by the multiple users authorized to access the entity over a specified window of time.

Example 5

The computing system according to Example 4, wherein the analytics data further indicates whether or not the number of times that the entity was accessed over the specified window of time has altered in comparison to previous windows of time.

Example 6

The computing system according to any of Examples 1-5, wherein the entity is a file folder that includes files accessible to the user by way of the file hosting application, and further wherein the analytics data indicates a number of activities undertaken by the user with respect to the filed accessed by the user over a specified window of time.

Example 7

The computing system according to any of Examples 1-5, wherein entity is a file, and further wherein the analytics data about the entity is indicative of a number of users who edit the file relative to numbers of users who edit other files hosted at the file hosting server over a specified time window.

Example 8

The computing system according to Example 7, wherein the analytics data indicates that, for the specified time window, more users have edited the file than any other file hosted at the file hosting server that the user is authorized to access.

Example 9

The computing system according to any of Examples 1-8, wherein the analytics data indicates a number of times that the entity has been shared with other users by way of the file sharing application.

Example 10

The computing system according to any of Examples 1-9, wherein the analytics data indicates a total amount of time, over a specified time window, that users who are authorized to access the entity have viewed or edited the entity.

Example 11

The computing system according to any of Examples 1-10, wherein the analytics data indicates geographic regions of client computing devices operated by users when the entity is accessed.

Example 12

A method executed by at least one processor, the method comprising: receiving, at a file hosting application executing on a file hosting server, a request for analytics data about an entity, the request received from a client computing device that is in network communication with the file hosting server, the entity hosted at the file hosting server and accessible to multiple client computing devices operated by users who are authorized by the file hosting application to access the entity; and in response to receiving the request for the analytics data about the entity, causing the analytics data about the entity to be displayed on a display of the client computing device in graphical form, the analytics data based upon activities undertaken with respect to the entity by way of the file hosting application executing on the file hosting server, wherein the activities are undertaken by the users who are authorized by the file hosting application to access the entity.

Example 13

The method according to Example 12, further comprising: detecting that the user has operated the client computing device to perform an activity with respect to the entity; and transmitting data to a server computing device that is configured to compute analytics data about entities hosted at the file hosting server, the data comprising an identity of the user, an identity of the entity, a type of the activity, and a time when the activity was undertaken with respect to the entity.

Example 14

The method according to any of Examples 12-13, the acts further comprising: in response to receiving the request for the analytics data about the entity, transmitting, to a server device that is configured to generate the analytics data, an identity of the entity; receiving the analytics data from the server device responsive to transmitting the identity of the entity to the server device; and causing the analytics data about the entity to be displayed on the display of the client computing device in graphical form responsive to receiving the analytics data from the server device.

Example 15

The method according to any of Examples 12-14, wherein the user belongs to an enterprise, and further wherein the analytics data is indicative of a number of teams in the enterprise who have users who accessed the entity over a specified window of time.

Example 16

The method according to any of Examples 12-15, wherein the entity is a file, and further wherein the analytics data is indicative of a number of times that the file has been edited by the users who are authorized by the file hosting application to access the file over a specified window of time.

Example 17

The method according to any of Examples 12-16, wherein the file hosting application supports sharing of entities, and further wherein the analytics data is indicative of a number of times that the entity has been shared by way of the file hosting application.

Example 18

The method according to Example 12, wherein entity is a file, and further wherein the analytics data about the entity is indicative of a number of users who edit the file relative to numbers of users who edit other files hosted at the file hosting server over a specified time window.

Example 19

The method according to any of Examples 12-18, wherein the analytics data indicates a total amount of time, over a specified time window, that users who are authorized to access the entity have viewed or edited the entity.

Example 20

A computer-readable storage medium comprising instructions that, when executed by at least one processor, cause the at least one processor to perform acts comprising: receiving, from a client computing device operated by a user in an enterprise, a request for analytics data about a file hosted at a file hosting server, wherein the file hosting server executes a file hosting application, wherein the file hosting application is configured to provide access to the file to users in the enterprise who are authorized by the file hosting application to access the file; and responsive to receiving the request, causing the analytics data to be displayed in graphical form on a display of the computing device, the analytics data based upon activities undertaken with respect to the file by the users in the enterprise who are authorized to access the file by way of the file hosting application over a specified window of time, wherein the activities were undertaken by way of the file hosting application.

Example 21

A system comprising: means for receiving, at a file hosting application executing on a file hosting server, a request for analytics data about an entity, the request received from a client computing device that is in network communication with the file hosting server, the entity hosted at the file hosting server and accessible to multiple client computing devices operated by users who are authorized by the file hosting application to access the entity; means for causing the analytics data about the entity to be displayed on a display of the client computing device in graphical form, the analytics data based upon activities undertaken with respect to the entity by way of the file hosting application executing on the file hosting server, wherein the activities are undertaken by the users who are authorized by the file hosting application to access the entity.

Figure 16:
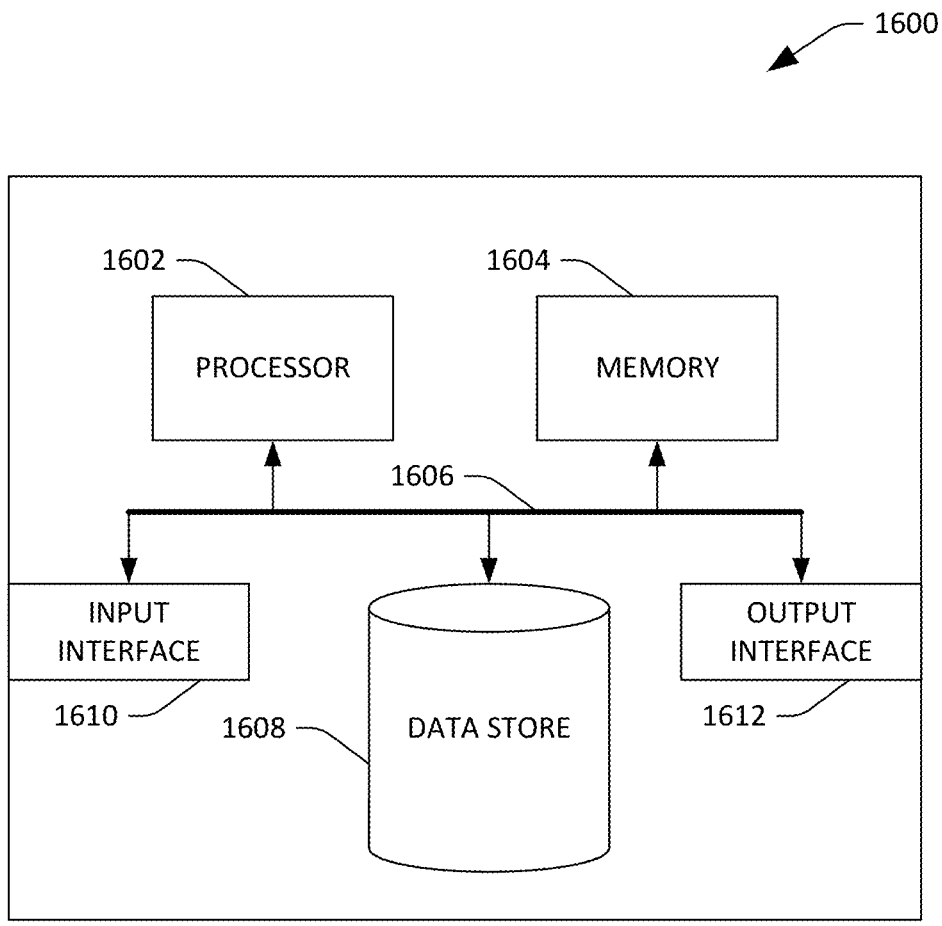
FIG. 16 illustrates an exemplary computing system.

Referring now to FIG. 16, a high-level illustration of an exemplary computing device 1600 that can be used in accordance with the systems and methodologies disclosed herein is illustrated. For instance, the computing device 1600 may be used in a system that supports generating analytics data about files hosted by way of a file hosting service. By way of another example, the computing device 1600 can be used in a system that supports rendering graphical user interfaces. The computing device 1600 includes at least one processor 1602 that executes instructions that are stored in a memory 1604. The instructions may be, for instance, instructions for implementing functionality described as being carried out by one or more components discussed above or instructions for implementing one or more of the methods described above. The processor 1602 may access the memory 1604 by way of a system bus 1606. In addition to storing executable instructions, the memory 1604 may also store metadata, images, analytics data, files, organizational data, etc.

The computing device 1600 additionally includes a data store 1608 that is accessible by the processor 1602 by way of the system bus 1606. The data store 1608 may include executable instructions, metadata, analytics data, files, organizational data, etc. The computing device 1600 also includes an input interface 1610 that allows external devices to communicate with the computing device 1600. For instance, the input interface 1610 may be used to receive instructions from an external computer device, from a user, etc. The computing device 1600 also includes an output interface 1612 that interfaces the computing device 1600 with one or more external devices. For example, the computing device 1600 may display text, images, etc. by way of the output interface 1612.

It is contemplated that the external devices that communicate with the computing device 1600 via the input interface 1610 and the output interface 1612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1600 may be a distributed system. Thus, for instance, several devices may be in communication by way of a network connection and may collectively perform tasks described as being performed by the computing device 1600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
at least one processor; and
memory that has a file hosting application loaded therein, wherein the file hosting application is used by multiple organizations to host computer-readable files, and further wherein the at least one processor, when executing the file hosting application, is configured to perform acts comprising:
receiving, from a client computing device that is in network communication with a file hosting server, a request for analytics data for an entity hosted by the file hosting server, wherein the entity is identified by the file hosting application as belonging to an organization in the multiple organizations, wherein a user of the client computing device has authenticated with the file hosting application; and
responsive to receiving the request for the analytics data, causing the analytics data to be presented in graphical form on a display of the client computing device, the analytics data is based upon activities undertaken at the file hosting server by way of the file hosting application with respect to the entity over time, wherein the activities were undertaken by multiple users authorized to access the entity using multiple different computing devices, wherein the analytics data is further based upon organizational data that identifies positions of the multiple users in the organization, the analytics data indicates a number of times that the entity was accessed by the multiple users authorized to access the entity over a specified window of time, and further wherein the analytics data additionally indicates whether or not the number of times that the entity was accessed over the specified window of time has altered in comparison to previous windows of time.

2. The computing system of claim 1, wherein the entity is a file hosted by the file hosting server, the acts further comprising:
causing a file identifier to be displayed on the display of the client computing device, the file identifier representative of the file hosted by the file hosting server; and
causing a button to be displayed adjacent the file identifier, wherein receiving, from the client computing device, the request for analytics data for the file comprises receiving an indication that the button has been selected by the user of the client computing device.

3. The computing system of claim 1, wherein the analytics data further indicates a number of users in the multiple users who accessed the entity over the specified window of time.

4. The computing system of claim 1, wherein the entity is a file folder that includes files accessible to the user by way of the file hosting application, and further wherein the analytics data further indicates a number of activities undertaken by the user with respect to the files accessed by the user over the specified window of time.

5. The computing system of claim 1, wherein the entity is a file, and further wherein the analytics data for the entity is additionally indicative of a number of users who edit the file relative to a numbers of users who edit other files hosted at the file hosting server over the specified time window.

6. The computing system of claim 5, wherein the analytics data further indicates that, for the specified time window, more users have edited the file than any other file hosted at the file hosting server that the user is authorized to access.

7. The computing system of claim 1, wherein the analytics data further indicates a number of times that the entity has been shared with other users by way of the file hosting application.

8. The computing system of claim 1, wherein the analytics data further indicates a total amount of time, over the specified time window, that users who are authorized to access the entity have viewed or edited the entity.

9. The computing system of claim 1, wherein the analytics data further indicates geographic regions of client computing devices operated by users when the entity is accessed.

10. A method executed by at least one processor, the method comprising:
receiving, at a file hosting application executing on a file hosting server, a request for analytics data about an entity, the request received from a client computing device that is in network communication with the file hosting server, the entity hosted at the file hosting server and accessible to multiple client computing devices operated by users who are authorized by the file hosting application to access the entity, wherein the file hosting application is used by multiple organizations to host files at network-accessible server computing devices, and further wherein the entity belongs to an organization in the multiple organizations that employs the file hosting application to host files on the file hosting server; and
in response to receiving the request for the analytics data about the entity, causing the analytics data about the entity to be displayed on a display of the client computing device in graphical form, the analytics data based upon:
activities undertaken with respect to the entity by way of the file hosting application executing on the file hosting server, wherein the activities are undertaken by the users who are authorized by the file hosting application to access the entity; and
organizational data for the organization, wherein the organizational data identifies positions of the users in the organization, wherein the analytics data indicates a number of times that the entity was accessed by the users authorized to access the entity over a specified window of time, and further wherein the analytics data additionally indicates whether or not the number of times that the entity was accessed over the specified window of time has altered in comparison to previous windows of time.

11. The method of claim 10, further comprising:
detecting that the user has operated the client computing device to perform an activity with respect to the entity; and
transmitting data to a server computing device that is configured to compute analytics data about entities hosted at the file hosting server, the data comprising an identity of the user, an identity of the entity, a type of the activity, and a time when the activity was undertaken with respect to the entity.

12. The method of claim 10, the acts further comprising:
in response to receiving the request for the analytics data about the entity, transmitting, to a server computing device that is configured to generate the analytics data, an identity of the entity;
receiving the analytics data from the server computing device responsive to transmitting the identity of the entity to the server computing device; and
causing the analytics data about the entity to be displayed on the display of the client computing device in graphical form responsive to receiving the analytics data from the server computing device.

13. The method of claim 10, wherein the user belongs to the organization, and further wherein the analytics data is additionally indicative of a number of teams in the organization who have users who accessed the entity over the specified window of time.

14. The method of claim 10, wherein the entity is a file, and further wherein the analytics data is additionally indicative of a number of times that the file has been edited by the users who are authorized by the file hosting application to access the file over the specified window of time.

15. The method of claim 10, wherein the file hosting application supports sharing of entities, and further wherein the analytics data is additionally indicative of a number of times that the entity has been shared by way of the file hosting application.

16. The method of claim 10, wherein entity is a file, and further wherein the analytics data about the entity is indicative of a number of users who edit the file relative to numbers of users who edit other files hosted at the file hosting server over the specified time window.

17. The method of claim 10, wherein the analytics data indicates a total amount of time, over the specified time window, that users who are authorized to access the entity have viewed or edited the entity.

18. A computer-readable storage medium comprising instructions that, when executed by at least one processor, cause the at least one processor to perform acts comprising:
receiving, from a client computing device operated by a user in an enterprise, a request for analytics data about a file hosted at a file hosting server, wherein the file hosting server executes a file hosting application, wherein the file hosting application is configured to provide access to the file to users in the enterprise who are authorized by the file hosting application to access the file, and further wherein the file hosting application is employed by multiple enterprises to host files of the multiple enterprises; and
responsive to receiving the request, causing the analytics data to be displayed in graphical form on a display of the computing device, the analytics data based upon:
activities undertaken with respect to the file by the users in the enterprise who are authorized to access the file by way of the file hosting application over a specified window of time, wherein the activities were undertaken by way of the file hosting application; and
organizational data, wherein the organizational data identifies positions of the users in the enterprise who are authorized to access the file by way of the file hosting application, wherein the analytics data indicates a number of times that the file was accessed by the users authorized to access the file over a specified window of time, and further wherein the analytics data additionally indicates whether or not the number of times that the file was accessed over the specified window of time has altered in comparison to previous windows of time.

19. The computer-readable storage medium of claim 18, wherein the analytics data further indicates a number of users in the multiple users who accessed the file over the specified window of time.

20. The computer-readable storage medium of claim 18, wherein the analytics data further indicates a number of times that the file has been shared with other users by way of the file hosting application.

* * * * *